June 19, 1956　　　M. A. WECKERLY　　　2,751,215
WEIGHING SCALES
Filed July 24, 1952　　　　　　　　　　2 Sheets-Sheet 1
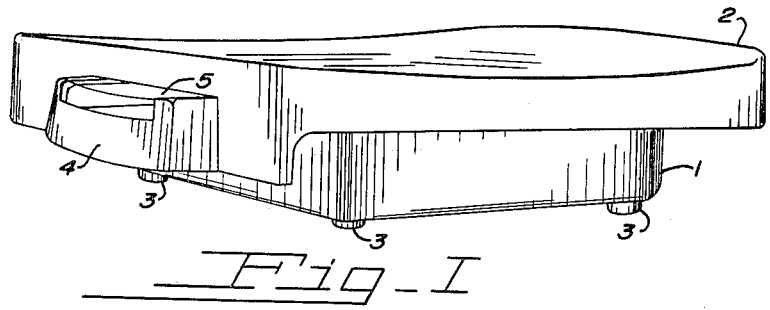
Fig. I
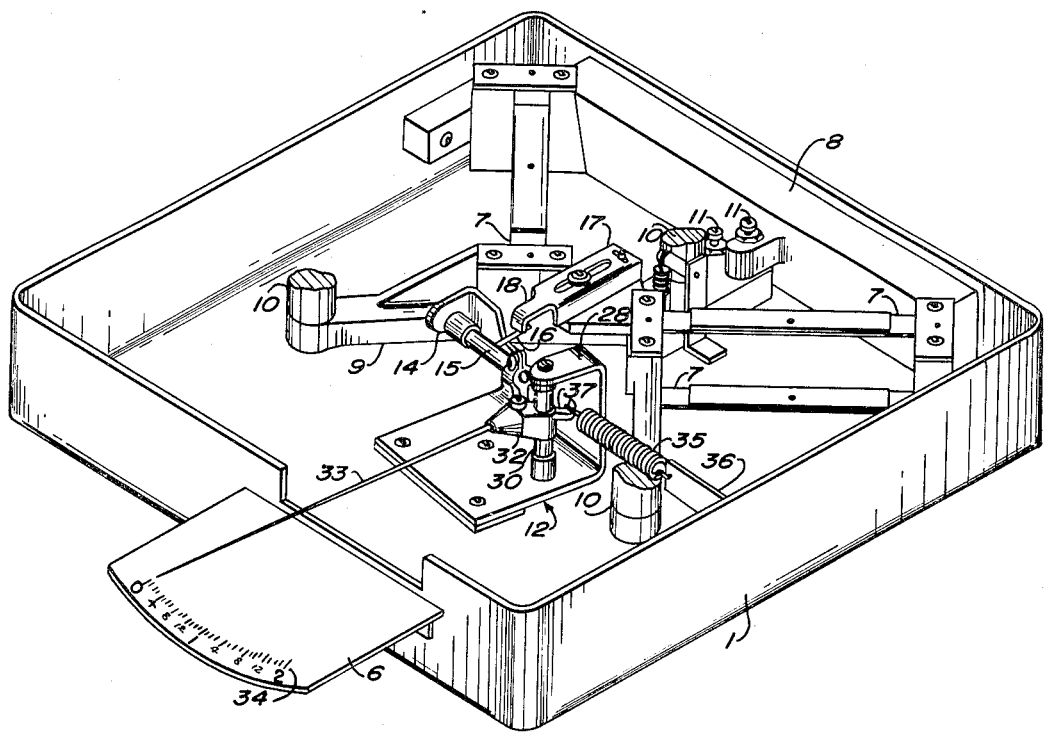
Fig. II
INVENTOR.
MARK A. WECKERLY
BY
Marshall, Marshall & Yeasting
ATTORNEYS June 19, 1956  M. A. WECKERLY  2,751,215
WEIGHING SCALES
Filed July 24, 1952 2 Sheets-Sheet 2
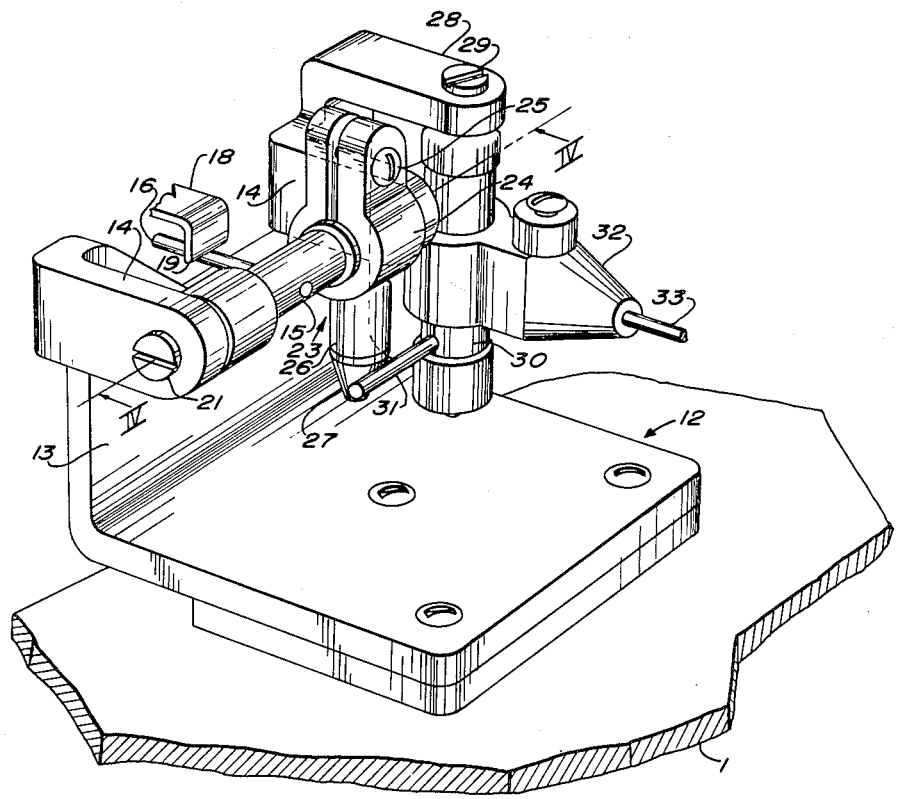
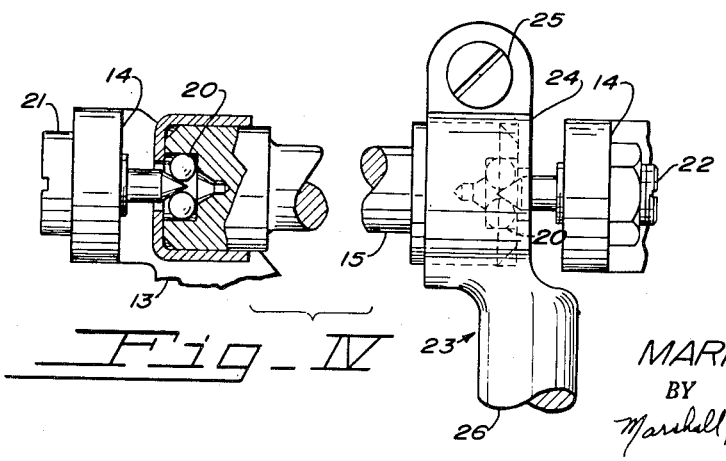
INVENTOR.
MARK A. WECKERLY
BY
ATTORNEYS United States Patent Office 2,751,215
Patented June 19, 1956

2,751,215

WEIGHING SCALES

Mark A. Weckerly, Toledo, Ohio, assignor to Toledo Scale Company, Toledo, Ohio, a corporation of New Jersey Application July 24, 1952, Serial No. 300,610

8 Claims. (Cl. 265—68)

This invention relates to weighing scales, and in particular to a weighing scale of the general type adapted to receive slices of a commodity as they are cut by a slicing machine.

Weighing scales adapted for use with slicing machines must be as vertically compact as possible, since they generally underlie a revolving knife of the slicer, which knife usually lies in an inclined or nearly horizontal plane to permit gravity feeding toward the knife of the commodity being sliced.

Difficulties are encountered in designing a vertically compact scale of this general type, and particularly in designing a substantially accurate yet simple indicating mechanism for such a scale. Since a slicer is generally placed upon a counter or table whereby a merchant may operate the slicer at approximately waist height, it is desirable that the chart of the scale be arranged so as to be easily viewed by the merchant while looking downwardly. This means that the weighing scale chart should lie in a nearly horizontal plane, and that the indicator which cooperates with the chart should be movable over the chart in an adjacent parallel plane.

The principal object of this invention is to provide an indicator drive mechanism for a weighing scale of the type described, which drive mechanism is particularly adapted to transfer vertical displacement of the weighing mechanism into pivotal movement of an indicator in a horizontal plane.

Another object of the invention is to provide a vertically compact weighing scale adapted for use with a commodity slicer.

Other objects and advantages will be apparent from the following description in which reference is had to the accompanying drawings.

According to the invention, when the weighing mechanism of a scale is displaced downwardly as a load is placed on a load receiver, a driver carried by the weighing mechanism pivots a horizontal drive shaft which in turn pivots a vertical indicator shaft which carries an indicator adapted to sweep over a horizontal scale chart.

In the drawings:

Figure I is a view in perspective of a weighing scale adapted for use with a commodity slicer.

Figure II is an isometric view of the weighing scale with the platter and chart casing removed to show the scale mechanism.

Figure III is a view in perspective of the indicator drive mechanism employed in the weighing scale.

Figure IV is a fragmentary view, partly in section, taken substantially along line IV—IV of Figure III.

Referring to Figure I, a weighing scale adapted for use with a commodity slicer comprises a low base 1 over which lies a shallow load receiver or platter 2 which receives slices of a commodity as they are cut by and fall away from a knife of the commodity slicer. A plurality of feet 3 support the base 1. The feet 3 are preferably made of a material which dampens vibrations of the commodity slicer thereby preventing the vibrations from affecting the weighing mechanism of the scale. A chart casing 4 has at its upper portion a transparent window 5 through which a merchant may view an indication of the load on the platter 2 upon a scale chart 6 (shown in Figure II).

Weighing mechanism of the type employed with the preferred embodiment of the invention comprises a plurality of flexure plates 7 each of which have one end mounted on a flexure plate support 8 fixed to the base 1. The flexure plates 7 are mounted as pairs one above the other and the pairs are generally coplanar. The pairs of flexure plates 7 extend from the flexure plate support 8 toward the center of the base 1 to resiliently support a platter spider 9. As seen in Figure II, the spider 9 is substantially Y-shaped and its branches support three legs 10 formed integrally with the platter 2. The spider 9 and the platter 2 which it carries thus are suspended within the base 1 by the flexure plates 7. Stop screws 11 are mounted to cooperate with one branch of the spider 9 and are adapted to provide limits of travel of the spider in a vertical direction.

An indicator support 12 is mounted from the base 1 adjacent the spider 9 and between the two branches of the spider opposite that which cooperates with the stop screws 11. The indicator support 12 is shown in both Figures II and III, Figure III showing the mechanism by itself in enlarged proportions as compared with the showing in Figure II. The support 12 is formed with a turned-up portion 13 from which laterally projects a pair of spaced apart ears 14 which are adapted to carry a pivotal drive shaft 15. The axis of the drive shaft 15 is horizontal and therefore is parallel to the plane of the base 1. A radially extending pin 16 is fixed to the drive shaft 15. When the weighing mechanism is at rest the pin 16 is substantially horizontal. During displacement of the weighing mechanism as a load is placed on the platter 2, the pin 16 is pivoted on the axis of the drive shaft 15 by a driver 17 carried on the spider 9. The driver has an integrally formed finger 18 with a rounded edge 19 which engages with the pin 16 to pivot the pin 16 as the weighing mechanism is displaced. The driver is adapted to be adjustable in relation to the spider 9 to facilitate accurate adjustment of the scale.

The ends of the drive shaft 15 carry ball bearings 20 (see Figure IV) which cooperate with the conical points of set screws 21 and 22 threaded through ears 14, and the drive shaft is therefore capable of pivotal movement with a minimum amount of friction. At one end of the drive shaft 15 is mounted a drive connection 23 which is formed of a portion 24 which engages around that end of the drive shaft 15 and is clamped to the drive shaft by a screw 25. The drive connection 23 has an offset portion 26 which extends radially downwardly from the drive shaft 15 and has fixed in its lower end a conical drive 27 which is made of a wear-resistant metal.

Adjacent the ear 14 which supports that end of the shaft 15 on which the drive connection 23 is carried is an ear 28 which projects in the same direction as the ears 14 but lies in a plane parallel to the base 1. The ear 28 has threaded therethrough a set screw 29 which is similar to and performs the same function as the set screw 21.

An indicator shaft 30 is supported for pivotal movement on its axis between the ear 28 and a portion of the indicator support 12 attached to the base 1. A second set screw (not shown) is threaded through that portion of the indicator support 12 spaced from the ear 28 and supports the indicator shaft 30 in a manner similar to that which the set screw 22 supports one end of the drive shaft 15.

A pin 31 extends radially from the indicator shaft 30 with its axis substantially parallel to the axis of the drive shaft 15 when the scale is at rest. The pin is adapted to be pivoted on the axis of the indicator shaft 30 when driven by the conical drive 27 as the drive shaft 15 is pivoted on its axis by its pin 16 when the driver 17 drives the pin 16. An indicator hub 32 is carried on the indicator shaft 30, and carries a radially extending indicator 33 which cooperates with graduations 34 on the horizontal scale chart 6 mounted at that side of the base 1 toward which the indicator 33 extends.

It may be seen that as the weighing mechanism moves downwardly in response to a load placed on the platter 2, the driver 17 pivots the drive shaft 15 by means of the pin 16, and the conical drive 27 carried by the drive connection 23 mounted on the shaft 15 pivots the indicator shaft 30 by means of the pin 31 with which the conical drive 27 engages. Pivotal movement of the indicator shaft 30 causes the indicator 33 to pass over the chart 6 thereby providing an indication to the merchant of the weight of the load on the platter 2.

The indicator is returned to its original position as the load is removed from the platter 2 by means of a tension coil 35 (see Figure II) which is fixed between a bracket 36 mounted at one side of the base and projection 37 of the indicator hub 32.

The embodiment of my invention herein shown and described is to be regarded as illustrative only and it is to be understood that the invention is susceptible to variation, modification and change within the spirit and scope of the subjoined claims.

Having described the invention, I claim:

1. In a weighing scale of the class described, in combination, a base, a load receiver above said base, load counterbalancing flexure plates supported from said base, a horizontal scale chart mounted at one side of the base, an indicator operatively connected to the load counterbalancing flexure plates, a driver mounted on the load counterbalancing flexure plates, a horizontal drive shaft carrying a substantially vertical arm and a substantially horizontal arm, said vertical arm being adjustable relative to said horizontal drive shaft, the substantially horizontal arm engaging the driver whereby the drive shaft is pivoted in response to movement of the driver, a vertical pivotal indicator shaft carrying said indicator and having an arm engaging said substantially vertical arm whereby said vertical shaft sweeps the indicator over the chart in response to movements of the drive shaft, and means for urging said indicator toward its rest position on said chart.

2. In a weighing scale, in combination, a base, a load receiver above said base, load counterbalancing flexure plates supported from said base, an indicator operatively connected to the load counterbalancing flexure plates, a chart with which the indicator cooperates, and indicator drive means comprising a driver carried by the load counterbalancing flexure plates, a horizontal drive shaft carrying a substantially vertical arm and a substantially horizontal arm, said vertical arm being adjustable relative to said horizontal drive shaft, the substantially horizontal arm engaging the driver whereby the drive shaft is pivoted on its axis by said driver, and an indicator shaft carrying an arm engaging said substantially vertical arm whereby the indicator shaft is adapted to be pivoted on its axis in response to pivotal movement of the drive shaft to cause said indicator to indicate the magnitude of loads placed on the load receiver.

3. An indicator drive mechanism for a weighing scale adapted to transfer vertical displacement of load counterbalancing flexure plates into a horizontal pivotal movement of an indicator over a scale chart, in combination, a driver carried by the load counterbalancing flexure plates, a horizontal drive shaft carrying a substantially vertical arm and a substantially horizontal arm, said vertical arm being adjustable relative to said horizontal drive shaft, the substantially horizontal arm engaging the driver whereby the drive shaft is pivoted on its axis by said driver, and a vertical indicator shaft carrying an arm engaging said substantially vertical arm whereby the indicator shaft is adapted to be pivoted on its axis in response to pivotal movement of the drive shaft to cause said indicator to move over the chart.

4. An indicator drive mechanism operatively connected to the load counterbalancing flexure plates of a weighing scale, comprising, in combination, a drive shaft carrying a substantially vertical arm and a substantially horizontal arm, said vertical arm being adjustable relative to said drive shaft, the substantially horizontal arm operatively connected to the load counterbalancing flexure plates whereby the drive shaft is pivoted on its axis in response to movements of the load counterbalancing flexure plates, and an indicator shaft carrying an arm engaging said substantially vertical arm whereby the indicator shaft is adapted to be pivoted upon pivotal movement of the drive shaft, said indicator shaft carrying an indicator which cooperates with a weighing scale chart.

5. In a weighing scale of the class described, in combination, a vertically compact base, a shallow platter above said base, load counterbalancing flexure paltes supported from said base and supporting said platter, a horizontal scale chart at one side of said base, an indicator cooperable with said chart, a vertical pivotal shaft on which the indicator is mounted and carrying a substantially horizontal member, a horizontal drive shaft carrying a substantially vertical arm engaging said substantially horizontal member whereby the drive shaft is adapted to pivot the indicator shaft on its axis, said vertical arm being adjustable relative to said horizontal drive shaft, and a driver carried by the load counterbalancing flexure plates adapted to pivot the drive shaft on its axis.

6. In a weighing scale of the class described, in combination, a base, a load receiver, load counterbalancing flexure plates supported from said base and supporting said load receiver, a scale chart at one side of said base, graduations on said chart extending from a zero marking, an indicator cooperating with the chart and adapted to align with the zero marking when the scale mechanism is at rest, a vertical pivotal shaft on which the indicator is mounted and carrying a substantially horizontal member, a horizontal drive shaft carrying a substantially vertical arm engaging said substantially horizontal member whereby the drive shaft is adapted to pivot the indicator shaft on its axis, said vertical arm being adjustable relative to said horizontal drive shaft, a driver carried by the load counterbalancing flexure plates, said driver being adapted to pivot the drive shaft on its axis as a load is placed on the load receiver, and a resilient member adapted to return the indicator to the zero marking on the chart when the load is removed from the load receiver.

7. In a weighing scale, in combination, a base, load counterbalancing flexure plates mounted from said base, a load receiver supported from said load counterbalancing flexure plates, a horizontal pivotal shaft having a substantially horizontal radially extending arm and a substantially vertical radially extending arm, said vertical arm being adjustable relative to said horizontal pivoted shaft, a drive member carried by said load counterbalancing flexure plates, said drive member engaging the horizontal arm of said horizontal shaft to pivot said shaft as a load is applied to the load receiver, a vertical pivot shaft having a horizontal radially extending arm drivingly engaged with the vertical arm of said horizontal shaft, an indicator extending radially from said vertical shaft, a chart with which said indicator cooperates, and means for urging the arm of said vertical shaft into engagement with the vertical arm of the horizontal shaft whereby the horizontal arm of said horizontal shaft remains in engagement with the driver.

8. In a weighing scale of the class described, in combination, a base, a load receiver above said base, load counterbalancing flexure plates supported from said base, a scale chart mounted at one side of the base, an indicator operatively connected to the load counterbalancing flexure plates for movement in a path substantially transverse to the path of movement of the load receiver, a driver mounted on the load counterbalancing flexure plates, a drive shaft having its axis of rotation substantially transverse to the path of movement of the load receiver, the drive shaft carrying a first arm substantially transverse to the path of movement of the indicator and a second arm engaging the driver whereby the drive shaft is rotated in response to movement of the driver, said first arm being adjustable relative to said drive shaft, a pivotal indicator shaft substantially transverse to the path of movement of the indicator carrying said indicator and having an arm engaging said first arm carried by the drive shaft whereby said pivotal indicator shaft sweeps the indicator over the chart in response to movements of the drive shaft, and means for urging said indicator toward its rest position on said chart.

References Cited in the file of this patent

UNITED STATES PATENTS

| Number | Name | Date |
|---|---|---|
| 1,233,124 | Powers | July 10, 1917 |
| 1,647,342 | Carter | Nov. 1, 1927 |
| 1,754,436 | Remington | Apr. 15, 1930 |
| 1,948,030 | Goldsworthy | Feb. 20, 1934 |
| 2,066,243 | Barler | Dec. 29, 1936 |
| 2,111,671 | McKinney | Mar. 22, 1938 |
| 2,175,024 | Hansen | Oct. 3, 1939 |
| 2,268,579 | Eisele | Jan. 6, 1942 |
| 2,607,228 | Coxon | Aug. 19, 1952 |
| 2,683,985 | Smulski | July 20, 1954 |

FOREIGN PATENTS

| Number | Country | Date |
|---|---|---|
| 565,436 | France | Nov. 10, 1923 |